(12) United States Patent
Luo et al.

(10) Patent No.: US 9,680,665 B2
(45) Date of Patent: Jun. 13, 2017

(54) APPARATUS AND METHOD FOR DYNAMIC HYBRID ROUTING IN SDN NETWORKS TO AVOID CONGESTION AND BALANCE LOADS UNDER CHANGING TRAFFIC LOAD

(71) Applicant: Futurewei Technologies, Inc., Plano, TX (US)

(72) Inventors: Min Luo, San Jose, CA (US); Junjie Zhang, Brooklyn, NY (US); Kang Xi, Morganville, NJ (US); Hung-Hsiang Chao, Holmdel, NJ (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 231 days.

(21) Appl. No.: 14/695,832

(22) Filed: Apr. 24, 2015

(65) Prior Publication Data
US 2015/0327135 A1    Nov. 12, 2015

Related U.S. Application Data (60) Provisional application No. 61/983,937, filed on Apr. 24, 2014.

(51) Int. Cl.
| | |
|---|---|
| *G01R 31/08* | (2006.01) |
| *H04L 12/64* | (2006.01) |
| *H04W 36/08* | (2009.01) |
| *H04L 12/803* | (2013.01) |
| *H04L 29/08* | (2006.01) |

(52) U.S. Cl.
CPC ........ *H04L 12/6418* (2013.01); *H04L 47/125* (2013.01); *H04L 67/1023* (2013.01); *H04L 67/1025* (2013.01); *H04W 36/08* (2013.01)

(58) Field of Classification Search
USPC ......................................................... 370/238
See application file for complete search history.

(56) References Cited

U.S. PATENT DOCUMENTS

| | | | | |
|---|---|---|---|---|
| 2008/0304414 | A1* | 12/2008 | Grenot | H04L 41/0896 370/235 |
| 2014/0280065 | A1* | 9/2014 | Cronin | G06F 17/30539 707/722 |
| 2016/0124992 | A1* | 5/2016 | Alesiani | G06F 9/5033 707/737 |
| 2016/0202074 | A1* | 7/2016 | Woodard | G06Q 10/047 701/465 |

FOREIGN PATENT DOCUMENTS

CN        102413021 A  *  4/2012   ............ H04L 12/26

* cited by examiner

*Primary Examiner* — Phuongchau Ba Nguyen
(74) *Attorney, Agent, or Firm* — Futurewei Technologies, Inc.

(57) ABSTRACT

Given a large number of traffic matrices, the matrices are divided into M clusters, where M is a relatively small number. A load-balancing apparatus is implemented as an application over the SDN controller. Such an application is executed to configure and reconfigure the switches to achieve near-optimal load balancing, even when the traffic load changes. For each cluster, a near-optimal explicit routing configuration is determined. The combination of explicit routing (cluster-specific) and destination-based routing (same for all clusters) is used to achieve near-optimal load balancing for each cluster.

22 Claims, 5 Drawing Sheets

APPARATUS AND METHOD FOR DYNAMIC HYBRID ROUTING IN SDN NETWORKS TO AVOID CONGESTION AND BALANCE LOADS UNDER CHANGING TRAFFIC LOAD

CROSS-REFERENCE TO RELATED APPLICATIONS

The present application claims priority to provisional application Ser. No. 61/983,937, filed on Apr. 24, 2014, entitled "APPARATUS AND METHOD FOR DYNAMIC HYBRID ROUTING IN SDN NETWORKS TO AVOID CONGESTION AND BALANCE LOADS UNDER CHANGING TRAFFIC LOAD" naming the same inventors as in the present application. The contents of the above referenced provisional application are incorporated by reference, the same as if fully set forth herein.

FIELD

Embodiments of the present invention generally relate to the field of computer networking More specifically, embodiments of the present invention relate to dynamic hybrid routing and load balancing for software-defined networking (SDN).

BACKGROUND

Balancing network traffic loads is critical for avoiding network congestion, achieving high bandwidth utilization, and ensuring quality of service ("QoS"). However, near-optimal load balancing is extremely difficult to achieve when the traffic changes dynamically. Currently, there is no satisfactory solution for this problem.

Two of the most common types of routing are static routing and dynamic routing. The aim of static routing is to find a trade-off among a set of traffic matrices and use a fixed routing configuration to deal with dynamic traffic. However, the performance of static routing is often far below optimal performance when traffic changes substantially. The key limitation to static routing is that a fixed routing that achieves optimal load balancing under all possible traffic conditions is not technically possible.

Dynamic routing performs a complete routing re-computation and reconfiguration to react to traffic changes. Theoretical optimality requires extremely high computational complexity and detailed configurations that cannot meet near-real-time demands. What is needed is a routing scheme that offers the benefits of dynamic routing while meeting near-real-time demands.

SUMMARY

Methods and apparatuses for performing dynamic hybrid routing are disclosed herein.

In one embodiment, an apparatus for performing dynamic hybrid routing in a centrally controlled network is disclosed and includes a data plane having multiple switches, a storage device configured to store historical traffic data, and an SDN controller coupled to the data plane and the storage device. The SDN controller is configured to generate traffic matrices from the historical traffic data, where the traffic matrices represent previous traffic load fluctuations, form clusters from the traffic matrices by merging the traffic matrices until a cluster merge cost reaches a predetermined threshold, generate explicit routing configurations for the clusters, and deploy a first explicit routing configuration which improves traffic load balance.

In another disclosed embodiment, a method for performing dynamic hybrid routing is disclosed. A set of traffic matrices is generated from historical measurement data representing traffic load fluctuation. A basic traffic matrix is constructed from the set of traffic matrices to represent the worst-case traffic load. A destination-based routing scheme is generated based on the basic traffic matrix to improve load balancing. Joint clustering and routing is performed. An explicit routing scheme is determined for one or more of the traffic matrices. The traffic matrices are merged into larger clusters until a cluster merge cost reaches a predetermined threshold. Upon detecting a change in traffic load, one of the explicit routing schemes is selected, where the selected explicit routing scheme improves traffic load balance.

In a third embodiment, a method of dynamic hybrid routing and load balancing for software-defined networking is disclosed and includes determining an explicit routing for clusters of traffic matrices, calculating a merge cost for pairs of clusters, identifying a first pair of clusters having a minimum merge cost, merging the first pair of clusters together, recording the explicit routing for the merged cluster, identifying one or more key flows of the first cluster based on the two or more traffic matrices, where the key flows contribute to network congestion, applying the explicit routing to the key flows, and applying a destination-based routing to a first set of traffic, where the first set of traffic does not include the key flows.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Embodiments are well suited to performing various other steps or variations of the steps recited in the flowchart of the figures herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a cellular antenna array. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer or other electronic computing device that manipulates and transforms data represented as physical (electronic) quantities within the system's registers and memories into other data similarly represented as physical quantities within the system memories or registers or other such information storage, transmission or display devices.

Apparatus and Method for Dynamic Hybrid Routing in SDN Networks to Avoid Congestion and Balance Loads Under Changing Traffic Load Apparatuses and methods for dynamic hybrid routing in centrally controlled networks are disclosed herein. According to some embodiments, the apparatus uses a set of representative traffic matrices to model changing traffic loads, a destination-based multipath routing algorithm to improve load balancing based on multiple traffic matrices, and a method to dynamically reconfigure explicit routing according to traffic changes to achieve balanced traffic loads. According to some embodiments, the apparatus uses a method to jointly merge traffic matrices into a set of clusters and calculate a hybrid routing configuration for each cluster, including: a method to jointly select a small set of flows in each cluster and optimize explicit routing for the selected set of flows, a method to combine destination-based routing and explicit routing in a complementary way to realize hybrid routing in a cluster, and a method to select two optimal candidate clusters and merge them.

SDN enables data forwarding capability to be decoupled from routing, resource management and other management needs. This functionality, distributed in IP networks, is logically centralized into a SDN controller. An SDN controller provides optimization for assigning network resources and routing traffic flows based on global network topology characteristics, states, and dynamic flow information.

Features of the various embodiments of the invention disclosed herein achieve efficient load balancing, high resource utilization, and low congestion probability under a changing traffic load. One effect is to minimize the possibility of congestion and achieve near-optimal load balancing. Embodiments of the present invention are highly scalable and provide low computation complexity, low configuration complexity, and low ternary content-addressable memory (TCAM) requirements. Consistent performance may be achieved under a variety of traffic scenarios and different network topologies, and the various embodiments disclosed herein may be easily implemented in most centrally controlled networks, such as SDN networks.

Some embodiments of the present invention are configured for obtaining a set of traffic matrices, finding a destination-based routing configuration that does not change when the real time traffic changes, assigning a large number of traffic matrices to a small number of clusters, and finding an explicit routing configuration for each cluster. When traffic conditions change, the best pre-determined explicit routing is dynamically selected to achieve load balancing.

Routing Computation and Real-Time Routing

Figure 1:
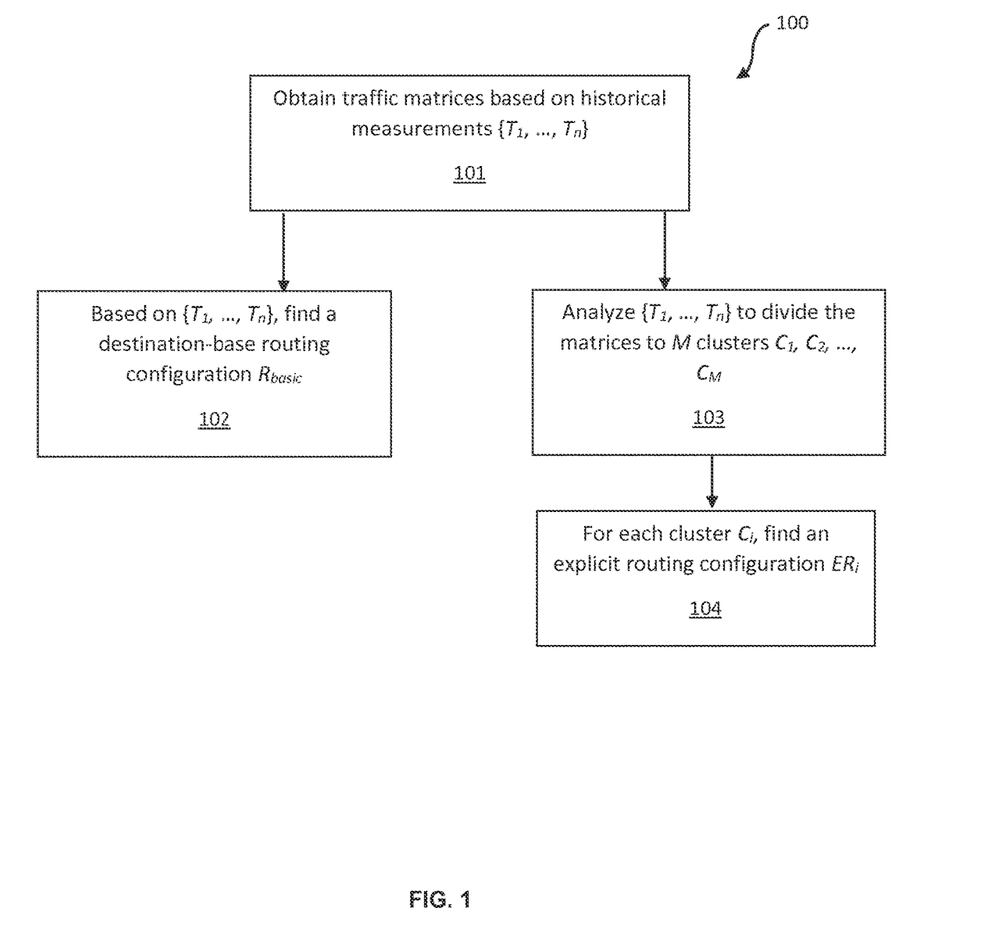
FIG. 1 is a flow chart illustrating an exemplary sequence of computer implemented steps for routing computation and real-time routing according to embodiments of the present disclosure.

With regard to FIG. 1, an exemplary sequence of computer implemented steps for route computation and real-time routing divides a period of time (e.g., a day) into a series of smaller time sections (e.g., morning, afternoon, evening/night), according to some embodiments of the present invention. Traffic matrices based on historical measurements are obtained at step 101. For each smaller time section, perform the following:

1. Routing computation step (may be completed in advance): Based on a historic traffic measurement, determine:
(A) One destination-based routing configuration (step 102)
(B) A set of explicit routing configurations (steps 103 and 104).
2. Real time routing: Always use the destination-based routing. The historical measurements are used to divide the matrices into M clusters at step 103. Based on the current traffic demand, an explicit routing configuration is selected from the result of step 1(B) and applied at step 104. This configuration will apply explicit routing to the traffic between a small set of source/destination pairs.

Figure 2:
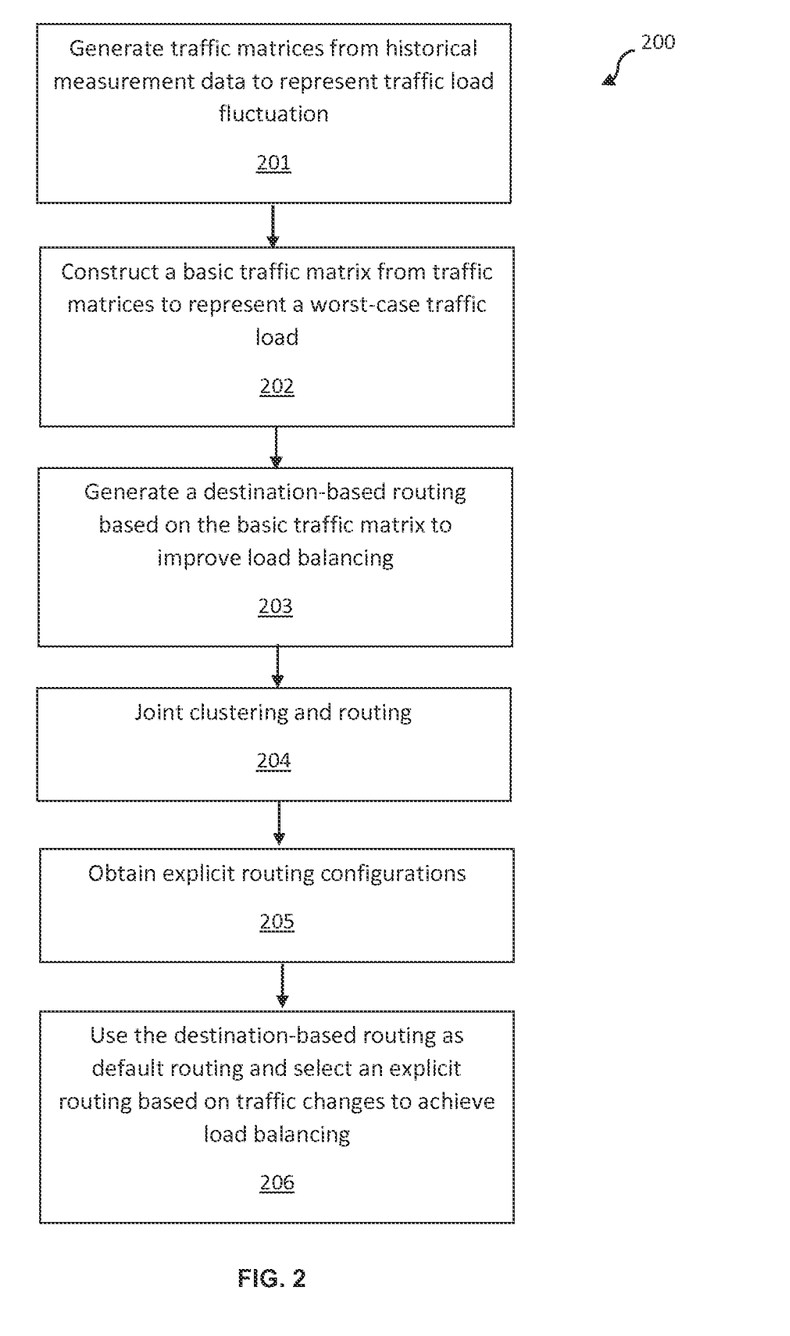
FIG. 2 is a flow chart illustrating an exemplary sequence of computer implemented for calculating destination-based routing and explicit routing for one or more clusters according to embodiments of the present disclosure.

With Regard to FIG. 2, an exemplary procedure 200 for calculating destination-based routing and explicit routing for clusters is depicted according to embodiments of the present invention. As described herein, a cluster is defined as a set of traffic matrices. At step 201, traffic matrices are generated from historical measurement data to represent traffic load fluctuation. A basic traffic matrix is constructed from the set of traffic matrices to represent the worst-case traffic load at step 202. Next, at step 203, a destination-based routing scheme is generated based on the basic traffic matrix to improve load balancing. Joint clustering and routing is performed at step 204, including: 1. Finding an explicit routing for the clusters; 2. Iteratively merging the traffic matrices into larger clusters until the merge cost reaches a pre-determined threshold. At step 205, a set of explicit routing configurations is obtained. At step 206, destination-based routing is used as the default routing and does not change when real time traffic changes. Based on traffic changes, an explicit routing is dynamically selected to achieve load balancing.

Destination-Based Routing

The objective of destination-based routing is to generate a set of traffic matrices based on historical data to represent fluctuating traffic load over a period of time. In a network having N nodes, the traffic matrix T has dimensions N×N, where element t(i,j) represent the traffic volume from node i to node j.

According to some embodiments, the traffic modeling method includes periodically checking the load of each link. When a load of any link exceeds a threshold (e.g., 80% of capacity), the traffic matrix is added to the set (because the current routing does provide satisfactory load balancing under the current traffic matrix).

Given L traffic matrices T1, T2, . . . , TL, a basic traffic matrix Tmax is constructed, where each element is determined as follows:

$$h_{max}^{s,d} = \max_{t=1,2,\ldots,L}\left(h_t^{s,d}\right)$$

$$\begin{pmatrix} 0 & 0 & 0 & 0 & 3 \\ 0 & 0 & 0 & 0 & 3 \\ 0 & 0 & 0 & 0 & 1 \\ 0 & 0 & 0 & 0 & 1 \\ 0 & 0 & 0 & 0 & 0 \end{pmatrix} \begin{pmatrix} 0 & 0 & 0 & 0 & 1 \\ 0 & 0 & 0 & 0 & 1 \\ 0 & 0 & 0 & 0 & 3 \\ 0 & 0 & 0 & 0 & 3 \\ 0 & 0 & 0 & 0 & 0 \end{pmatrix} \Longrightarrow \begin{pmatrix} 0 & 0 & 0 & 0 & 3 \\ 0 & 0 & 0 & 0 & 3 \\ 0 & 0 & 0 & 0 & 3 \\ 0 & 0 & 0 & 0 & 3 \\ 0 & 0 & 0 & 0 & 0 \end{pmatrix}$$

$$(T_1) \qquad (T_2) \qquad (T_{max})$$

For each node pair (s,d), a maximum demand volume is selected from the set of traffic matrices and used in a basic traffic matrix, where the basic traffic matrix represent the worst-case traffic load. The worst-case can be adjusted by factors for a selected link set {(i,j)} based on historical observation, empirical measure, and/or network management expectations.

A common destination-based routing is determined using Tmax. This routing is a trade-off among the worst-case scenarios used to improve traffic load balancing. The technique describes the routing paths but does not request bandwidth based on the worst-case demand. Based on the basic traffic matrix (e.g., worst-case or adjusted load), linear programming may be used to find an optimal destination-based multipath routing. The objective of the linear programming is to minimize the maximum link load while ensuring the routing is loop-free. A link load generated by destination-based multipath routing and flow conservation constraint is used as a constraint of the linear programming.

A Linear Programming ("LP") package (e.g., CPLEX) may be used to determine the optimal solution. It is also possible to develop a heuristic algorithm (e.g., simulated annealing) based on the above formulation. The result from this step are better than equal-cost multi-path routing or Open Shortest Path First routing (OSPF/ECMP). However, the results from this step are based on the worst-case loads and over-provisioning may degrade stability or performance.

Joint Clustering and Routing

A cluster is defined as a set of traffic matrices. Given a large number of traffic matrices, T1, T2, . . . , TN, the objective is to divide the matrices into M clusters. An explicit routing configuration is determined for the clusters. The combination of explicit routing (cluster-specific) and destination-based routing (same for all clusters) achieves near-optimal load balancing. As a result, the total number of explicit routing configurations to be used to perform dynamic load balancing may become relatively small, yet sufficient to achieve a high level performance.

Figure 3:
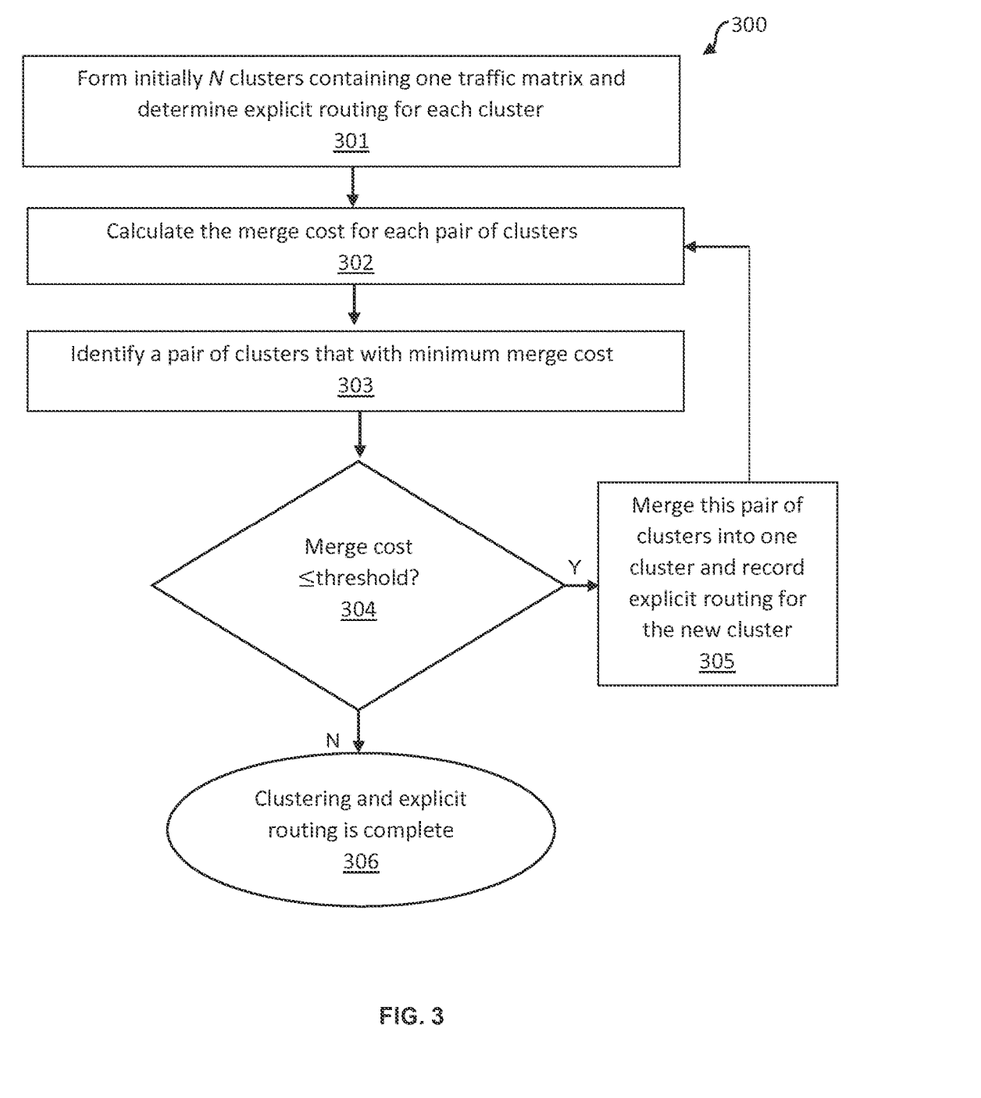
FIG. 3 is a flow chart illustrating an exemplary sequence of computer implemented steps for clustering and explicit routing according to embodiments of the present disclosure.

With regard to FIG. 3, an exemplary sequence of computer implemented steps for clustering and explicit routing is depicted in flow chart 300 according to embodiments of the present invention. At step 301, N clusters are formed, where each cluster contains one traffic matrix and calculate a complementary explicit routing for each cluster. At step 302, calculate the merge cost for each pair of clusters. There are two key considerations regarding these two steps:
1. Given a cluster including multiple matrices, how is a complementary explicit routing found?
2. How to define merge cost?

At step 303, a pair of clusters that with minimum merge cost is identified. At step 304, if the merge cost is equal to or less than a predetermined threshold, merge this pair of clusters into one cluster and record explicit routing for the new cluster, and the process returns to step 302. If the merge cost is greater than the predetermined threshold, the clustering and explicit routing process ends at step 306.

Hybrid Routing in a Cluster=Explicit Routing+Destination-Based Routing

To determine an explicit routing ("$R_{explicit}$"), a small number of key flows are processed using explicit routing. For destination-based routing ("$R_{basic}$") the remainder of the flows are processed using a previously calculated destination-based routing. This $R_{basic}$ is common among all clusters. It is important to determine the optimal explicit routing so that the above combination of $R_{explicit}$ and $R_{basic}$ achieves optimal load balancing.

$$\text{Dynamic Hybrid Routing: } R_{basic} + \begin{cases} R_{explicit}^1 \begin{cases} T_1, \\ T_2, \\ T_3, \\ T_4, \end{cases} \\ R_{explicit}^2 \begin{cases} T_5, \\ T_6, \\ T_7, \end{cases} \\ \vdots \\ R_{explicit}^k \begin{cases} \vdots \\ T_n \end{cases} \end{cases}$$

For an exemplary cluster of traffic matrices C={T1, T2, T3, . . . }, a relatively small number of (s,d) pairs are identified. Traffic flows between such pairs are called key flows. A previously obtained destination-based routing is used for traffic other than the key flows. An explicit routing for delivering traffic of the key flows is determined for all traffic matrices in the cluster. Key flows contribute greatly to network congestion and it may be difficult for destination-based routing to balance such flows; therefore, explicit routing is used. Finding key flows and explicit routing ensures near-optimal load balancing for traffic matrices in a cluster.

A performance ratio P(C) for a cluster is determined based on traffic matrices in a cluster C and a routing configuration. Performance ratio P(C) indicates how far is a routing configuration from being optimal at the worst case for each given traffic matrix. For example, where C includes three exemplary traffic matrices T1, T2, and T3, for a certain routing configuration, the max link utilization under T1, T2, and T3 are 0.6, 0.85, and 0.9, respectively. In addition, the maximum link utilization achieved by the optimal routing for the traffic matrices are 0.3, 0.6, and 0.9. Therefore, in this example P(C)=max(0.6/0.3, 0.85/0.6, 0.9/0.9)=2. Here P(C) is based on a hybrid routing scheme which combines the destination-based routing obtained previously with explicit routing.

Joint Key Flows Selection and Explicit Routing Optimization

Where $\delta^{s,d}$ is a binary variable equal to 1, traffic from s to d is routed using explicit routing. Otherwise, the traffic from s to d is routed using destination-based routing. The problem can be formulated as a mix-integer programming (MIP) problem. For the purpose of minimizing rerouting impact, the objective function of MIP is minimizing the number of selected key flows. A link load is generated by destination-based routing and explicit routing and a flow conservation constraint is used as a constraint of the linear programming, and a performance ratio should be equal to or less than a pre-determined threshold.

The solution for the above problem gives the fewest selected key flows and the corresponding complementary explicit routing configuration for the selected key flows. The combination of explicit routing and destination-based routing that achieves the required performance.

Searching among all node pairs to identify the optimal key flows selection and calculating the complementary explicit routing configuration for the selected key flows incur considerable complexity and thus might be impractical for large networks. Thus, an approximate technique is used to reduce computation complexity, e.g., select a small set of potential key flows which contribute traffic to the congested links in advance, then conduct the hybrid routing optimization upon this small set of potential key flows (rebalancing traffic flows on the congested links would bring more benefits).

Figure 4:
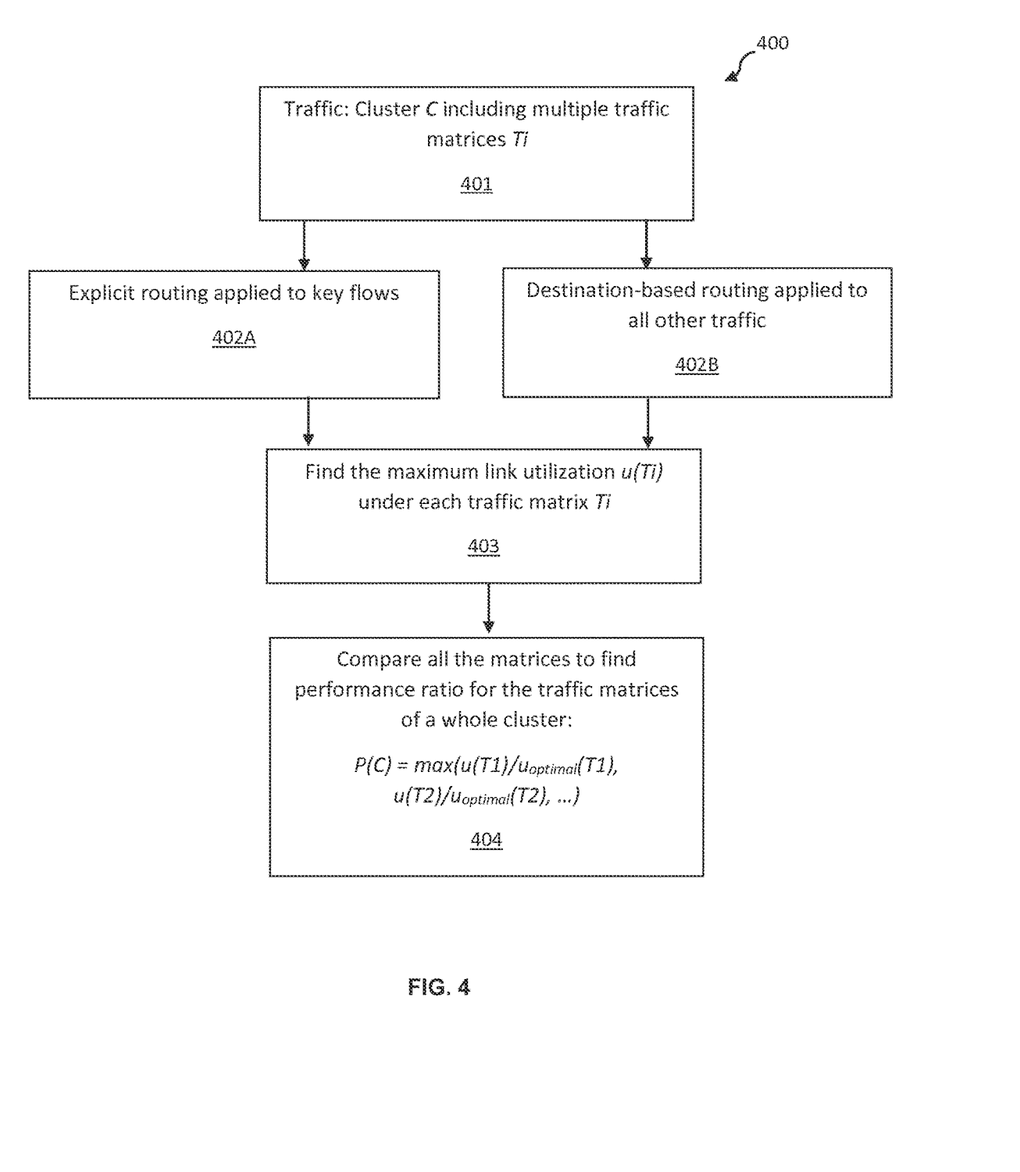
FIG. 4 is a flow chart illustrating an exemplary sequence of computer implemented steps for determining a performance ratio of cluster according to embodiments of the present disclosure.

With regard to FIG. 4, an exemplary sequence of computer implemented steps 400 for determining a performance ratio of a cluster is depicted according to embodiments of the present invention. At step 401, a cluster C including multiple traffic matrices Ti is formed. At step 402A, explicit routing is applied to key flows, and at step 402B, destination-based routing applied to all the other traffic. The maximum link utilization U(Ti) is determined at step 403 under each traffic matrix Ti. All matrices are compared at step 404 to determine a performance ratio for the traffic matrices of the whole cluster.

Identify Potential Key Flows in a Cluster of Traffic Matrices

To identify potential key flows in a cluster of traffic matrices, a target number of key flows K (e.g., 20 key flows) is determined. The following procedure is performed recursively until K flows are identified:

1. For each flow (s,d)
  A. For each traffic matrix Ti from the cluster:
    1. Set the traffic from s to d to 0 (e.g., t(s,d)=0)
    2. Apply the destination-based routing
    3. Find the maximum link utilization Ui
  B. When flow (s,d) is removed, the maximum link utilization in the cluster is set to U(s,d)=max(U1, U2, . . . )
2. Compare all the flows to find the flow (x,y) that gives a minimum value of U(x,y) (using explicit routing for traffic between (x,y) optimally improves load balancing).
3. Record (x,y) as a key flow, set traffic to 0 for the matrices
4. Repeat the above steps to find the next key flow Merging of Two Clusters For two exemplary clusters C1={T1, T2} and C2={T7, T8, T9}, merging C1 and C2 gives C3=C1 U C2={T1, T2, T7, T8, T9}. A new explicit routing must be computed for the new cluster C3. Using hybrid routing, a common destination-based routing is used for the three cluster, and each cluster uses an optimized explicit routing.

Given a pre-determined performance ratio threshold $P_{threshold}$ (e.g., 1.05), assume that to ensure $P(C1) \leq P_{threshold}$, the minimum number of selected key flows for C1 is $K_{C1}=10$. To ensure $P(C2) \leq P_{threshold}$, $K_{C2}=5$. Because the explicit routing for C3 is a trade-off among more traffic matrices, to guarantee $P(C3) \leq P_{threshold}$, there must be:

$K_{C3} \geq K_{C1}$ and $K_{C3} \geq K_{C2}$ (Note that in this example the clusters use different explicit routing configurations.)

The cost of merging is expressed as:

$$\text{Merge Cost} = \begin{cases} K_{C3}, & P(C3) \leq P_{threshold} \\ \text{total flow number} + 1, & P(C3) > P_{threshold} \end{cases}$$

Using "total flow number+1" to indicate the merge cost means C1 and C2 may never merge because the performance requirement is unsatisfied. Merging two clusters with a smaller merging cost is preferable to minimize rerouting flows while the performance requirement is satisfied.

Method to reduce clustering computation complexity

For C1, C2, C3, and C4, there are total 6 cluster merging options, e.g., C5=C1UC2, C6=C1UC3, C7=C1UC4, C8=C2UC3, C9=C2UC4, C10=C3UC4. There must be $K_{C5} \geq K_{C1}$ and $K_{C5} \geq K_{C2}$, so the lower bound of merge cost of C5 (e.g., $K^L_{C5}$) is $\max(K_{C1}, K_{C2})$. An exemplary procedure for identifying a pair of clusters with a minimum merge cost comprises the following steps:

1. Calculate a lower bound of merge cost for C6, C7, C8, C9, C10. Assume that $K_{C1}=2$, $K_{C2}=3$, $K_{C3}=4$, $K_{C4}=5$.
2. Record the lower bound of merge cost for each clusters merging options and sort them in ascending order, e.g., $K^L_{C5}=3$, $K^L_{C6}=4$, $K^L_{C8}=4$, $K^L_{C7}=5$, $K^L_{C9}=5$, $K^L_{C10}=5$.
3. Calculate an actual merge cost of a first cluster merging option in the array (e.g., C5), to determine $K_{C5}=6$. Sort the merge cost again, e.g., $K^L_{C6}=4$, $K^L_{C8}=4$, $K^L_{C7}=5$, $K^L_{C9}=5$, $K^L_{C10}=5$, $K_{C5}=6$.
4. Check the first merging option in the merge cost array. If it is not an actual merge cost, calculate the actual merge cost (e.g., $K_{C6}=4$). Sort the merge cost again, $K_{C6}=4$, $K^L_{C8}=4$, $K^L_{C7}=5$, $K^L_{C9}=5$, $K^L_{C10}=5$, $K_{C5}=6$.
5. Check the first merging option in the merge cost array. If it is an actual merge cost, the procedure is terminated. C6=C1UC3 is guaranteed to be minimal. Because there must be $K_{C8} \geq K^L_{C8}$, $K_{C7} \geq K^L_{C7}$, $K_{C9} \geq K^L_{C9}$, $K_{C10} \geq K^L_{C10}$, $K^L_{Ci}$ is used to indicate the lower bound of merge cost and avoids the calculation of actual merge cost for some merging options.

Exhaustive Dynamic Explicit Routing Selection

During run time, the SDN controller monitors the networks to obtain the current traffic matrix and the utilization on each link. When the utilization on a certain link exceeds a threshold (e.g, 90%), the controller can start to select a new explicit routing and configure the SDN switches accordingly. Routing selection may be based on an exhaustive search. For the explicit routings, combine the explicit routing with the default destination-based routing, and use the current matrix as input to obtain the maximum link utilization. The controller examines all the explicit routing configurations and selects the one that minimizes the maximum link utilization. According to some embodiments, the computation complexity is $O(RMN^2)$, where R is the number of explicit routing configurations, M is the edge number, N is the node number.

Efficient Dynamic Explicit Routing Selection

An exemplary procedure for performing routing selection based on an efficient search comprises the following steps:

Definitions:
  a. $h_{now}^{s,d}$: the current traffic demand from s to d
  b. $\beta_e^{s,d}$: traffic share from s to d routed on link e, when pair <s,d> is routed using the default destination-based routing
  c. $a_e^{s,d}(i)$: traffic share from s to d routed on link e, when pair <s,d> is routed by the i-th explicit routing configuration 1. Use the current traffic matrix and the default destination-based routing as input to obtain a preliminary link load result (e.g., a link load on each link $l_e$).
2. Once the i-th explicit routing configuration is applied to rebalance traffic of the selected key flows, the affected traffic load on each link $\Delta_e^i$ is given by:
  a. $\Delta_e^i = \Sigma_{(s,d) \in D_i} h_{now}^{s,d} * (a_e^{s,d}(i) - \beta_e^{s,d})$ where $D_i$ is the set of selected key flows for i-th explicit routing configuration. (Note that the number of selected key flows in $D_i$ is $K_{Ci}$.)
  b. The selected key flows $(s,d) \in D_i$ will no longer be routed by destination-based routing. Thus, $\Sigma_{(s,d) \in D_i} h_{now}^{s,d} * \beta_e^{s,d}$ is subtracted from link load.
3. According to the preliminary link load result, the most congested link is determined, and the corresponding maximum link utilization is denoted as $U_{default}$.
4. Once one of R explicit routing configurations is applied to rebalance traffic, there are three possible outcomes for $\Delta_{max}$ (the affected traffic load on the most congested link):

$$\Delta_{max} \begin{cases} = 0, & \text{the traffic load on the most congested link remains unchanged} \\ > 0, & \text{the traffic load on the most congested link is increased} \\ < 0, & \text{the traffic load on the most congested link is decreased} \end{cases}$$

If the outcome is first one or second one (e.g., 0 or greater than 0), applying this explicit routing configuration is not productive because it does not alleviate the link congestion.
5. By evaluating $\Delta_{max}$ in this way, some explicit routing configurations can be excluded in advance without carefully calculating the utilization for each link and doing the comparison. According to some embodiments, the computation complexity of evaluating $\Delta_{max}$ is $O(RK_{max})$, where R is the number of explicit routing configurations, $K_{max}$ is the maximum number of selected key flows of each explicit routing configurations, $K_{max}$ is relatively small.
6. For those explicit routing configurations that give $\Delta_{max} < 0$, further comparison is required to find out which configuration is optimal. For each explicit routing configuration where $\Delta_{max} < 0$, the following steps are performed:
  a. Calculate $\Delta_e$ of the link that would be affected when applying the explicit routing configuration to rebalance traffic. (Note that the $\Delta_e$ is 0 for unaffected links. No additional computation is required for the unaffected link.)
  b. After applying the explicit routing, the updated link load $l'_e$ is given by:
    i. $l'_e = l_e + \Delta_e$
    ii. According to $l'_e$, the maximum link utilization can be obtained.
  c. Select the explicit routing configuration that minimizes the maximum link utilization. The achieved minimum maximum link utilization is denoted as $U_{hybird}$.
  d. In some special cases, there may be $U_{hybird} > U_{default}$. For these cases, solely using the default destination-based routing is sufficient for handle the current traffic matrix.

According to some embodiments, the computation complexity is $O(RMK_{max})$. The total complexity of efficient dynamic hybrid routing selection is $O(MN^2) + O(RK_{max}) + O(RMK_{max}) = O(MN^2 + RMK_{max})$. Note that the complexity of exhaustive dynamic hybrid routing selection is $O(RMN^2)$. Since $K_{max}$ is relative small compared to $N^2$, the computation complexity is greatly reduced.

Application and Deployment

Based on the traffic modeling, one set of destination-based routing and M sets of explicit routing are obtained, where each routing configures at most K node pairs. The destination-based routing is received by the network elements (e.g., routers and switches) and is used for default packet forwarding. Based on the current traffic matrix, one of the M explicit routings is dynamically selected based on similarity and/or correlation to achieve load balancing under changing traffic.

Figure 5:
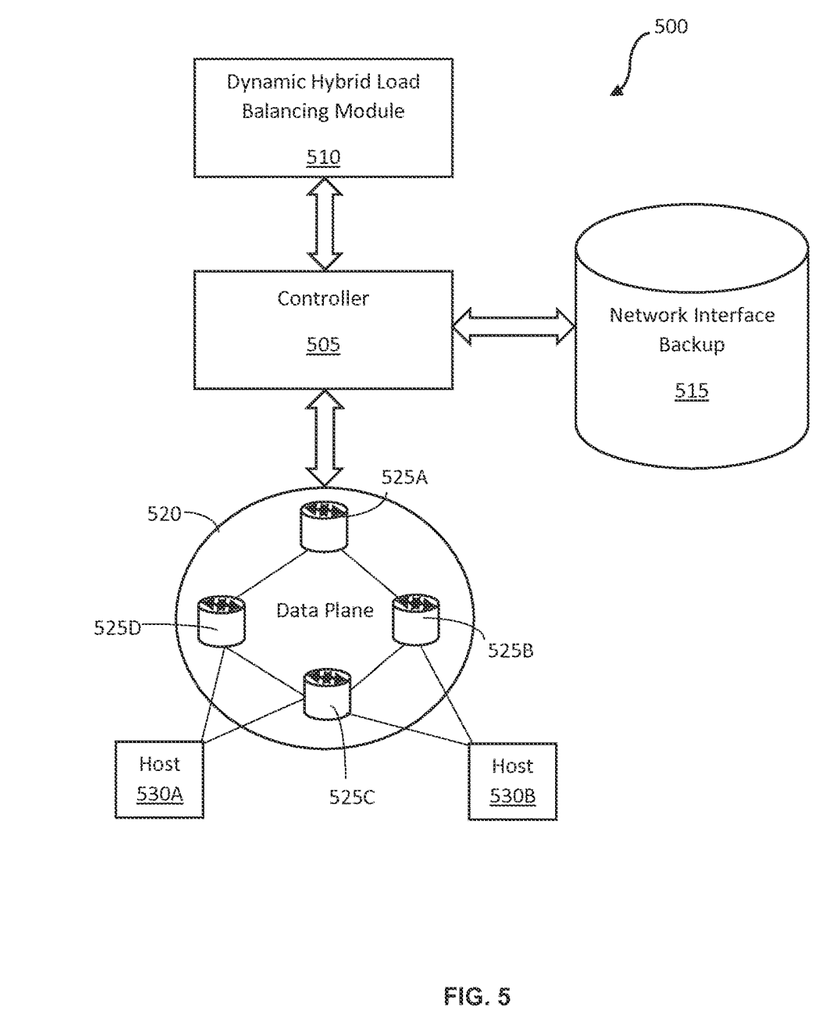
FIG. 5 is a diagram illustrating an exemplary computer network for implementing dynamic hybrid routing to avoid congestion and balance traffic loads according to embodiments of the present disclosure.

With regard to FIG. 5, an exemplary computer network 500 for implementing dynamic hybrid routing to avoid congestion and balance traffic loads is depicted according to embodiments of the present disclosure. A set of traffic matrices is generated from historical measurement data representing traffic load fluctuation. According to some embodiments, historical measurement data is retrieved from Network Interface Backup 515 using controller 505.

A basic traffic matrix is constructed from the set of traffic matrices to represent a worst-case traffic load, and a destination-based routing scheme is generated based on the basic traffic matrix to improve load balancing. Joint clustering and routing is performed and an explicit routing scheme is determined for one or more of the traffic matrices. The traffic matrices are merged into larger clusters until the merge cost reaches as predetermined threshold, and a hybrid routing configuration is calculated for the clusters based on the explicit routing and the destination-based routing as previously described.

A load-balancing module 510 is used to configure and network switches (e.g., switches 525A, 525B, 525C, and 525D of data plane 520) to achieve near-optimal load balancing, even when the traffic load changes. According to some embodiments, load-balancing module 510 is implemented as an application over SDN controller 505. According to other embodiments, load-balancing module 510 comprises a dedicated hardware component. SDN Applications may be loaded by controller 505 and executed using a combination of network components (e.g., switches, controllers, and hosts) using the routing techniques disclosed herein.

A plurality of network hosts (e.g., hosts 530A and 530B) are communicatively coupled to one or more switches of data plane 520. One SDN application may be used to assign virtual IPs to hosts 530A and 530B within the network, and a mapping of virtual IPs to actual IPs is performed by controller 505.

During run time, SDN controller 505 monitors the networks to obtain the current traffic matrix and the utilization over the network links. When a utilization of a certain link exceeds a threshold (e.g., 90% of capacity), controller 505 may select a new explicit routing configuration and configure SDN switches 525A, 525B, 525C, and/or 525D of data plane 520, accordingly. Each explicit routing may be combined with the default destination-based routing, and a current traffic matrix may be used as input to obtain a maximum link utilization. Controller 505 examines the explicit routing configurations and selects one that minimizes the maximum link utilization. This technique significantly outperform static optimal explicit routing because the dynamic method adapts to traffic changes, while the static method seeks trade-off among different traffic matrices.

Embodiments of the present invention are thus described. While the present invention has been described in particular embodiments, it should be appreciated that the present invention should not be construed as limited by such embodiments, but rather construed according to the following claims.

What is claimed is:

1. An apparatus for performing dynamic hybrid routing in a centrally controlled network comprising:
    a data plane comprising a plurality of switches;
    a storage device configured to store historical traffic data; and
    a controller coupled to the data plane and the storage device, wherein the controller is configured to:
        generate a plurality of traffic matrices from the historical traffic data, wherein the traffic matrices represent previous traffic load fluctuations;
        form a plurality of clusters from the traffic matrices by merging the traffic matrices until a merge cost reaches a predetermined threshold;
        generate explicit routing configurations for the clusters; and
        deploy a first explicit routing configuration which improves traffic load balance.

2. The apparatus of claim 1, wherein the controller is further configured to:
    generate a destination-based routing configuration based on the traffic matrices; and
    configure a first switch of the plurality of switches using the destination-based routing configuration.

3. The apparatus of claim 2, wherein the controller is further configured to:
    divide a period of time into smaller periods of time; and
    determine a destination-based routing configuration for each smaller period of time based on the historical traffic data.

4. The apparatus of claim 2, wherein the controller is further configured to configure a second switch of the centrally controlled network using the explicit routing configuration when a change in traffic conditions of the centrally controlled network is detected.

5. The apparatus of claim 4, wherein the configuring the second switch comprises applying the explicit routing configuration to traffic moving between a set of source-destination pairs.

6. The apparatus of claim 1, wherein forming a plurality of clusters from the traffic matrices comprises iteratively merging the traffic matrices into larger clusters until the merge cost reaches the pre-determined threshold.

7. The apparatus of claim 1, wherein the controller is further configured to:
    select a maximum demand volume for a pair of nodes of the traffic matrices; and
    generate a basic traffic matrix based on the maximum demand volume, wherein the basic traffic matrix represents a worst-case traffic load.

8. A method for performing dynamic hybrid routing based on historical traffic data, comprising:
    generating a set of traffic matrices from historical traffic data representing previous traffic load fluctuations;
    generating a first traffic matrix representing a worst-case traffic load based on the set of traffic matrices;
    determining a destination-based routing scheme based on the first traffic matrix;
    determining one or more explicit routing schemes for one or more traffic matrices of the set of traffic matrices;
    merging traffic matrices of the set of traffic matrices to form clusters until a merge cost reaches a predetermined threshold; and
    upon detecting a change in traffic load, selecting an explicit routing scheme.

9. The method of claim 8, wherein the selected explicit routing scheme improves traffic load balance.

10. The method of claim 9, further comprising applying the explicit routing configuration to traffic moving between a set of source-destination pairs.

11. The method of claim 10, wherein configuring one or more network switches comprises using an SDN controller.

12. The method of claim 8, wherein determining a destination-based routing scheme comprises using linear programming.

13. The method of claim 12, wherein the linear programming is performed using CPLEX.

14. The method of claim 9, further comprising periodically checking a traffic load of a link and adding a new traffic matrix representing the link to the set of traffic matrices when a traffic load of the link exceeds a threshold value.

15. The method of claim 14, wherein the threshold value is based on a percentage of maximum traffic load associated with the link.

16. A method of dynamic hybrid routing and load balancing for software-defined networking comprising:
    determining an explicit routing scheme for a plurality of clusters of traffic matrices;
    calculating a merge cost for pairs of the clusters;
    identifying a first pair of clusters having a minimum merge cost;
    merging the first pair of clusters together;
    recording the explicit routing for the merged cluster;
    identifying one or more key flows of the first cluster based on the two or more traffic matrices, wherein the key flows contribute to network congestion;
    applying the explicit routing scheme to the key flows; and
    applying a destination-based routing scheme to a first set of traffic, wherein the first set of traffic does not include the key flows.

17. The method of claim 16, further comprising configuring one or more SDN switches using the explicit routing.

18. The method of claim 16, further comprising using a heuristic algorithm to determine a combination of explicit routing and destination-based routing to improve load balancing.

19. The method of claim 16, wherein merging the pair of clusters together does not cause a significant increase in traffic congestion.

20. The method of claim 16, further comprising merging pairs of clusters together until a threshold merge cost is reached.

21. The method of claim 16, further comprising using linear programming to determine a combination of explicit routing and destination-based routing to improve traffic load balance.

22. The method of claim 21, wherein the linear programming is performed using CPLEX.

* * * * *